US011575884B1

(12) United States Patent
de Lima et al.

(10) Patent No.: US 11,575,884 B1
(45) Date of Patent: Feb. 7, 2023

(54) DISPLAY CALIBRATION SYSTEM

(71) Applicant: Apple Inc., Cupertino, CA (US)

(72) Inventors: Osborn F. de Lima, Santa Clara, CA (US); Jiaying Wu, San Jose, CA (US); Lu Zhang, Campbell, CA (US); Nathaniel C. Begeman, Saratoga, CA (US); Shahram Peyvandi, Santa Clara, CA (US); Adria Fores Herranz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 16/907,027

(22) Filed: Jun. 19, 2020

Related U.S. Application Data

(60) Provisional application No. 62/878,909, filed on Jul. 26, 2019.

(51) Int. Cl.
*H04N 17/02* (2006.01)
*G09G 3/20* (2006.01)
*H04M 1/72409* (2021.01)

(52) U.S. Cl.
CPC ............... *H04N 17/02* (2013.01); *G09G 3/20* (2013.01); *H04M 1/72409* (2021.01); *G09G 2320/0693* (2013.01); *G09G 2360/144* (2013.01)

(58) Field of Classification Search
CPC .. H04N 17/02; G09G 3/20; G09G 2320/0693; G09G 2360/144; H04M 1/72409
See application file for complete search history.

(56) References Cited

U.S. PATENT DOCUMENTS 6,219,099 B1 4/2001 Johnson et al.
6,771,307 B2 8/2004 Waki et al.
7,133,148 B2 11/2006 Silverstein
7,262,779 B1 8/2007 Sones
(Continued)

FOREIGN PATENT DOCUMENTS

TW I691213 B 4/2020

OTHER PUBLICATIONS

THX Ltd., THX tune-up™, App Store, Jan. 4, 2017, Retrieved from the Internet: <https://apps.apple.com/us/app/thx-tune-up/id592624594>.

(Continued)

*Primary Examiner* — Michael Lee
(74) *Attorney, Agent, or Firm* — Treyz Law Group, P.C.; G. Victor Treyz; Tianyi He

(57) ABSTRACT

A system may include multiple electronic devices. A first device such as a source electronic device may supply visual content for displaying by a display in a second electronic device such as a display electronic device. The display electronic device may be a television or other device with a display. Calibration operations may be performed by taking light measurements on light produced by the display when test content is provided from the first device to the second device. A third electronic device in the system such as a portable electronic device with an ambient light sensor may make measurement on the light from the display while the test content is being displayed. The test content may contain a test image target with time-varying color and time-varying intensity, allowing calibration information such as gamma curves to be obtained on the display.

20 Claims, 8 Drawing Sheets

(56) References Cited

U.S. PATENT DOCUMENTS 7,639,401 B2 12/2009 Bala et al.
7,733,404 B2 6/2010 Zandifar et al.
8,023,996 B2 9/2011 Camp, Jr.
8,248,454 B2 8/2012 Thielman
8,582,034 B2 11/2013 Kwong
8,704,895 B2 4/2014 Safaee-Rad et al.
8,836,796 B2 9/2014 Dickins et al.
8,994,714 B2 3/2015 Erinjippurath et al.
9,384,709 B2 7/2016 Winer
9,462,265 B2 10/2016 An et al.
9,479,769 B2 10/2016 Wright et al.
9,532,023 B2 12/2016 Hung
9,615,012 B2 4/2017 Geiss et al.
9,658,816 B2 5/2017 Qian et al.
9,826,226 B2 11/2017 Kunkel et al.
9,894,340 B2 2/2018 Holub
10,192,514 B2 1/2019 Su et al.
10,347,050 B1 7/2019 Wang et al.
10,467,985 B2 11/2019 Aflatooni et al.
10,649,713 B1 * 5/2020 Liu .......................... G09G 5/02
2004/0046767 A1 * 3/2004 Cloutier ................... H04N 9/69 348/E17.005
2004/0070565 A1 * 4/2004 Nayar ................... G06T 15/506 345/156
2004/0196250 A1 10/2004 Mehrotra et al.
2007/0052735 A1 * 3/2007 Chou ................... G09G 3/2003 345/690
2007/0132790 A1 * 6/2007 Miller ...................... G09G 5/06 345/690
2008/0204605 A1 * 8/2008 Tsai ................... H04N 21/4318 348/734
2010/0066837 A1 * 3/2010 Kwong .................... H04N 9/73 348/180
2010/0188418 A1 7/2010 Sakai et al.
2011/0032286 A1 2/2011 Takata
2012/0026139 A1 * 2/2012 Chou ................... G09G 3/3406 345/207
2012/0127324 A1 5/2012 Dickins et al.
2012/0162532 A1 * 6/2012 Oniki ..................... H04N 5/202 348/725
2014/0232709 A1 * 8/2014 Dunn ....................... G09G 5/02 345/207
2015/0229919 A1 8/2015 Weber et al.
2015/0235615 A1 8/2015 Yoshida et al.
2015/0282282 A1 * 10/2015 Breuer .............. H04M 1/72533 315/152
2015/0317928 A1 11/2015 Safaee-Rad et al.
2016/0050359 A1 2/2016 Nakata
2016/0165229 A1 6/2016 Kao et al.
2016/0180780 A1 6/2016 Chen et al.
2016/0323327 A1 11/2016 Riecken et al.
2017/0047048 A1 * 2/2017 Rumreich ................ G09G 5/10
2017/0084250 A1 3/2017 Jia et al.
2017/0256039 A1 * 9/2017 Hsu .......................... G09G 5/02
2017/0302915 A1 10/2017 Kang et al.
2017/0345352 A1 11/2017 Hemminiki et al.
2018/0204524 A1 7/2018 Kucera et al.
2019/0313050 A1 * 10/2019 Wang ....................... H04N 5/58
2020/0143768 A1 * 5/2020 Huang .................... G01J 3/465

OTHER PUBLICATIONS

Monitor Adjustment—ColorNavigator, EIZO Inc., Sep. 13, 2016, Retrieved from the Internet: <https://www.eizo.com/library/management/matching/calibration/step2_cn.html/>.

SpecliaViewII, NEC Display Solutions, Apr. 30, 2014, Retrieved from the Internet: <https://www.necdisplay.com/support-and-services/spectra-view-ii/overviewNEC>.

CalMAN RGB Computer Calibration Software, SpectraCal, Jul. 6, 2016, Retrieved from the Internet: <https://calman.spectracal.com/>, Portrait Displays.

U.S. Appl. No. 16/506,410, filed Jul. 9, 2019.

* cited by examiner

DISPLAY CALIBRATION SYSTEM

This application claims the benefit of provisional patent application No. 62/878,909, filed Jul. 26, 2019, which is hereby incorporated by reference herein in its entirety.

FIELD

This relates generally to electronic devices, and, more particularly, to systems with electronic devices and displays.

BACKGROUND

Electronic devices such as televisions are used to display movies and other content for a user. Some televisions are provide with content from external sources such as media player boxes. Televisions are often used with factory settings, which can lead to undesired color casts and other undesired characteristics for displayed content. If care is not taken, content from an external source will be adversely affected by a television's settings.

SUMMARY

A system may include multiple electronic devices. A first device such as a source electronic device may supply visual content for displaying by a display in a second electronic device such as a display electronic device. The display electronic device may be a television or other device with a display. Calibration operations for the display may be performed by taking light output measurements on test content that is provided from the first device to the second device. A third electronic device in the system such as a portable electronic device with an ambient light sensor may perform these calibration operations by making measurements on the light output of the display while the test content is being displayed.

The test content may contain a target with time-varying color and time-varying intensity, allowing calibration information such as a white point and/or gamma curves to be obtained on the display. The calibration information may be used in adjusting a white point, contrast settings, brightness settings, and/or other settings for content being provided from the first device to the second device during normal operations.

If desired, a fourth device in the system such as a voice-controlled speaker or other device in the vicinity of the second device may be used in gathering ambient light measurements. During normal operation, as the first device is providing images to the second device that the second device is displaying on the display of the second device for the user, the first device or the second device may dynamically adjust color cast and/or intensity for the images based on the gathered ambient light measurements.

DETAILED DESCRIPTION

A system for presenting visual content to a user may include multiple electronic devices. The system may include an electronic device that has a display. The system may also include an electronic device that serves as a source of video, still images, and other visual content. The source device may be used to provide visual content to the display. To ensure that the content is displayed with desired attributes, calibration operations may be performed. For example, a color ambient light sensor in another device such as a portable device may be used in making calibration measurements on the display while the source device provides a variety of test images containing test targets or other test patterns of different colors and intensities. Calibration information can then be stored in the source device and used to calibrate content provided to the display. When the display is subsequently used to display visual content, images on the display will have a desired white point and other desired visual attributes.

Figure 1:
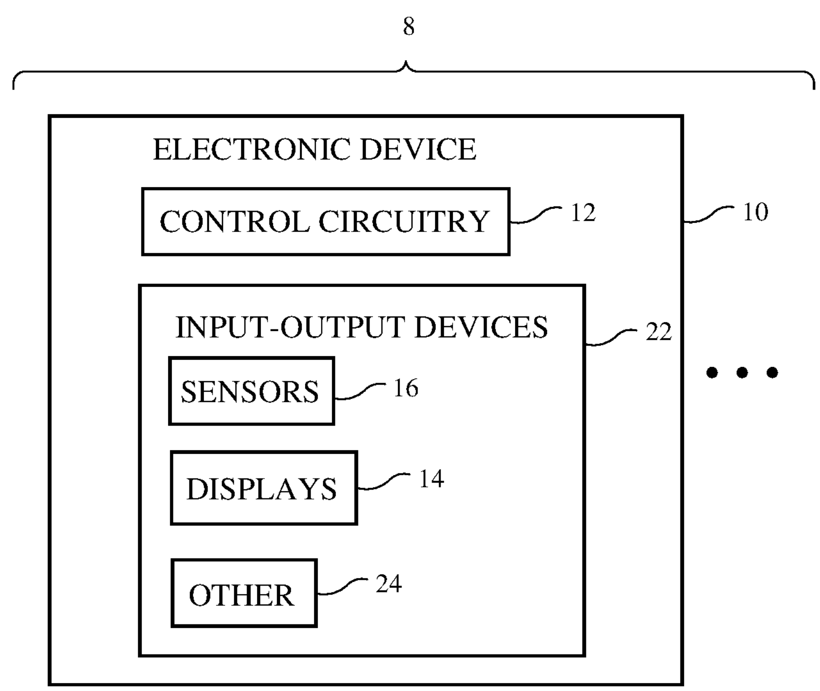
FIG. 1 is a schematic diagram of an illustrative system in which a display may be calibrated in accordance with an embodiment.

A schematic diagram of an illustrative system that includes electronic devices is shown in FIG. 1. As shown in FIG. 1, system 8 may include one or more electronic devices such as electronic device 10. The electronic devices of system 8 may include computers (e.g., tablet computers, laptop computers, desktop computers, etc.), televisions, cellular telephones, source devices for providing still and moving images (e.g., devices of the type that are sometimes referred to as consoles, media players, or set-top boxes, or other sources of images), voice-controlled speakers or other countertop devices (sometimes referred to as virtual assistant devices), head-mounted devices, wristwatch devices, and other electronic devices.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry and/or personal area network transceiver circuitry (e.g., WiFi® transceiver circuitry, Bluetooth® transceiver circuitry, etc.), millimeter wave transceiver circuitry, and/or other wireless communications circuitry.

During operation, the communications circuitry of the devices in system 8 (e.g., the communications circuitry of control circuitry 12 of device 10) may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the Internet, local area networks with wired switches and/or wireless access points, peer-to-peer links, etc.). The communications circuitry may be used to allow data to be received by device 10 from external equipment (e.g., a tethered device, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display(s) 14. Display 14 is used to display visual content for a user of device 10. The content that is presented on display 14 may include color images containing photographs, graphics, text, and other still content and/or movies and other video content. Display 14 may use may be a liquid crystal display, a plasma display, a light-emitting diode display such as an organic light-emitting diode display, a projection display, or other suitable display.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), color and/or monochrome ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), radio-frequency sensors that determine the location of other devices (and therefore the relative position of such devices relative to device 10), and/or other sensors.

User input and other information may be gathered using sensors and other input devices in input-output devices 22 and/or input accessories coupled to device 10. If desired, input-output devices 22 may include other devices 24 such as haptic output devices (e.g., vibrating components), light-emitting diodes and other light sources, speakers such as ear speakers for producing audio output, and other electrical components. If desired, device 10 may include circuits for receiving wireless power, circuits for transmitting power wirelessly to other devices, batteries and other energy storage devices (e.g., capacitors), input devices such as joysticks and buttons, and/or other components.

Electronic device 10 may have housing structures (e.g., housing walls, internal supporting frames, etc.). Control circuitry 12 and input-output devices 22 may be mounted within the housing.

A user of system 8 may use any suitable number of electronic devices 10, each of which may communicate with other electronic devices in the system using wired and/or wireless communications. Devices 10 in system 8 may have different capabilities. For example, one of the electronic devices in system 8 (e.g., a television) may have a large display, another electronic device (e.g., a source device that supplies images to the television) may have a small console form factor without a display, another electronic device may be a cellular telephone or watch with a smaller display, and yet another device may optionally be nearby equipment such as a voice-controlled countertop speaker with or without a display that serves as a digital assistant. Different devices may also have different sensors, different control circuits, different housings, different shapes, etc.

Figure 2:
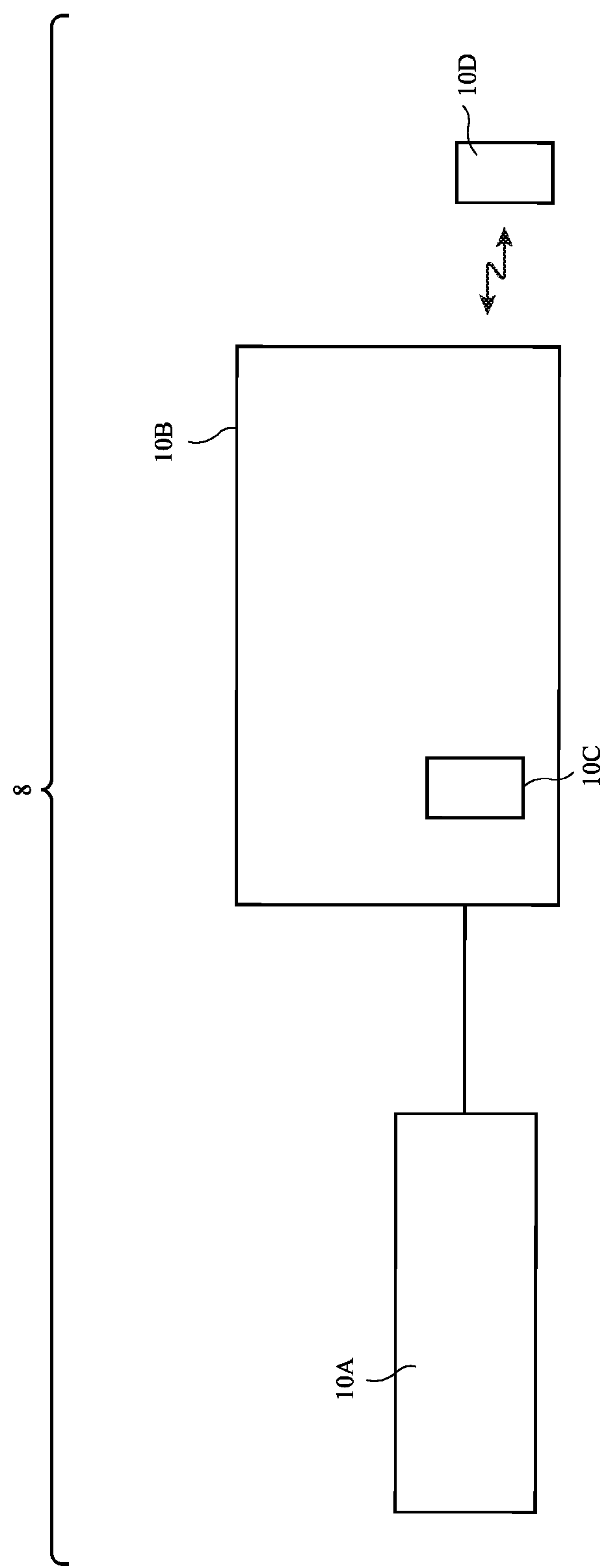
FIG. 2 is a schematic diagram of an illustrative system with multiple electronic devices in accordance with an embodiment.

Consider, as an example, illustrative system 8 of FIG. 2. As shown in FIG. 2, system 8 may include devices 10A, 10B, 10C, and 10D. In this illustrative arrangement, device 10A may be a source device that supplies images to device 10B over a wired or wireless connection. Display device 10B may be a television or other device with a display. Due to manufacturing variations and other effects (e.g., aging effects), the display of device 10B may benefit from calibration. Portable device 10C may be a portable electronic device such as a cellular telephone, wristwatch, or tablet computer. A color ambient light sensor in device 10C may gather measurements on test images presented on device 10B. For example, device 10C may have a forward-facing ambient light sensor that can gather measurements when device 10C is held face down against the display of device 10B.

Device 10C may communicate wirelessly with other equipment in system 10 such as device 10A. Optional nearby device 10D, which may communicate wirelessly with devices 10A, 10B, and/or 10C, may be a voice-controlled speaker, computer, or other device in the vicinity of device 10D that has an ambient light sensor for measuring ambient lighting conditions in the operating environment for device 10B. The ambient light readings from device 10D may optionally be used in adjusting the image on device 10B.

Figure 3:
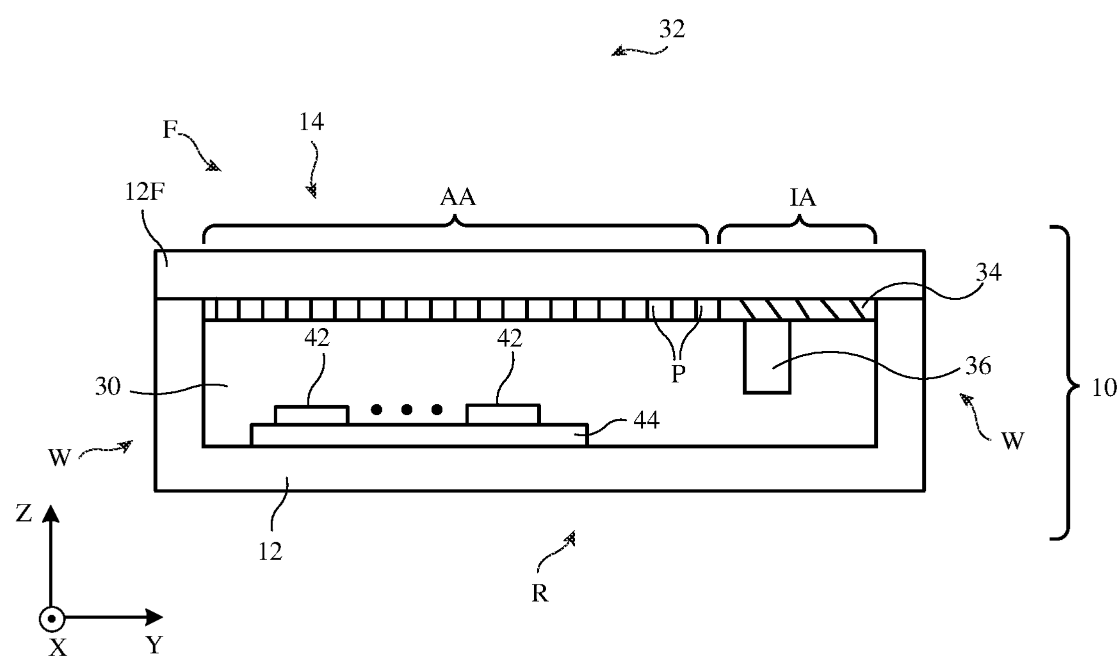
FIG. 3 is a cross-sectional side view of an illustrative electronic device in accordance with an embodiment.

One or more of the devices in system 8 may have an ambient light sensor. A cross-sectional side view of an illustrative device 10 with an ambient light sensor is shown in FIG. 3. Device 10 of FIG. 3 is a portable device such as a cellular telephone, wristwatch device, or tablet computer. Other types of electronic devices may be provided with ambient light sensors if desired. Electronic device 10 may be, for example, a computing device such as a laptop computer, a television, a source device, a voice-controlled speaker, a pendant device, a display, a gaming device, a head-mounted device, a desktop computer with an integrated display, an embedded system such as a system mounted in a kiosk or automobile, or other electronic equipment.

Electronic device 10 of FIG. 3 may have a display such as display 14 mounted in a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose an interior region such as interior region 30 within device 10 and may separate interior region 30 from an exterior region such as exterior region 32 surrounding device 10. The housing walls may include a rear wall on rear side R of device 10, sidewalls on edges W of device 10, and a transparent housing wall that serves as a display cover layer on front side (face) F of device 10. Front side F opposes rear side (face) R of device 10 in the illustrative configuration of FIG. 3. Other arrangements may be used for forming housing 12 in device 10, if desired.

Display 14 may be a liquid crystal display, an organic light-emitting diode display, or other suitable display. Display 14 may have an array of pixels P. The portion of housing 12 that overlaps display 14 may sometimes be referred to as a display cover layer. The display cover layer (e.g., display cover layer 12F in the example of FIG. 1) may be formed from glass, crystalline material such as sapphire, clear polymer, other transparent materials, and/or combinations of these materials. The display cover layer may be coupled to metal housing walls or other housing structures in housing 12 and may sometimes be referred to as forming transparent housing structures or a transparent housing wall.

Display cover layer 12F may overlap active area AA of display 14 on front side F of device 10. During operation, pixels P of active area AA may display an image for viewing by a user of device 10. Display 14 may be borderless or nearly borderless (e.g., pixels P and active area AA may cover all or most of front side F of device 10). In some configurations, one or more portions of display cover layer 12F may overlap inactive display areas such as inactive area IA. Inactive area IA may contain display driver circuitry and other components, but does not include pixels and does not display images. Inactive area IA may, as an example, form a notch at one end of device 10. Configurations in which inactive area IA forms a border that runs along one or more peripheral edges of device 10 or in which inactive area IA forms an isolated island surrounded by pixels P in active area AA may also be used.

In configurations for device 10 such as the illustrative configuration shown in FIG. 3, opaque material may be formed as a coating on an inner surface of the display cover layer in inactive area IA, as shown by opaque coating layer 34. This opaque coating layer, which may sometimes be referred to as an opaque masking layer, ink layer, opaque ink layer, etc., may be black (e.g., black ink formed from black dye and/or black pigment in a polymer), may be white, gray, silver, or other neutral colors, or may have a non-neutral color (e.g., red, blue, yellow, etc.). In some configurations, the opaque coating layer may be formed from multiple sublayers. The opaque coating layer may be visible from the exterior of device 10 (e.g., through peripheral portions of the display cover layer. Due to the presence of the opaque coating layer in inactive area IA, display driver circuitry and other components in inactive area IA may be hidden from view from the exterior of device 10.

Optical components may be mounted within device 10. For example, an ambient light sensor may be mounted within interior 30 and may make ambient light measurements on ambient light received through display cover layer 12F. In some configurations, ambient light may be received through transparent portions of active area AA. In the example of FIG. 3, ambient light sensor assembly 36 is mounted under inactive area IA and is configured to receive light through a portion of inactive area IA.

The portion of device 10 through which ambient light sensor assembly 36 receives ambient light from exterior region 32 may sometimes be referred to as an ambient light sensor window. An ambient light sensor window may be formed in any suitable portion of housing 12. For example, an ambient light sensor window may be formed within an opaque portion of housing 12 (e.g., in a wall on an edge W or rear side R). If desired, an ambient light sensor window may, as shown in the example of FIG. 3, be formed within a portion of layer 34. In this type of configuration, a portion of layer 34 may be provided with perforations or other openings, locally thinned opaque material (sufficiently thin to allow light to pass), selectively altered coating materials (e.g., ambient light sensor window ink that is at least partly transparent and/or has desired spectral properties), thin-film interference filter coating structures, other suitable window structures, and/or combinations of these structures.

Ambient light sensor windows may be provided with sufficient transparency to allow ambient light to pass from exterior 32 to components in interior 30 such as ambient light sensor assembly 36. This allows ambient light sensor readings to be taken during the operation of device 10.

As shown in FIG. 3, electrical components 42 may be mounted in interior 30 of device 10 (e.g., on a substrate such as printed circuit 44 located between display cover layer 12F on front side F and an opposing rear housing wall on rear side R). Components 42 may include integrated circuits, discrete components, light-emitting components, sensors, and/or other circuits. Electrical components 42 may include control circuitry (see, e.g., control circuitry 12 of FIG. 1) and input-output-devices (see, e.g., input-output devices 22 of FIG. 1).

Figure 4:
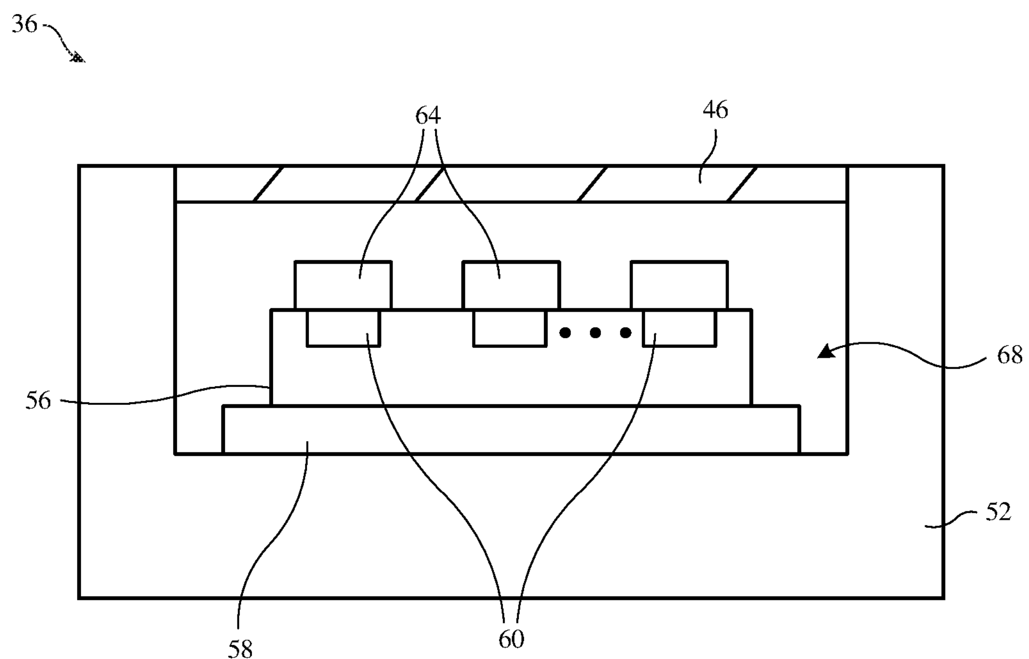
FIG. 4 is a cross-sectional side view of an illustrative ambient light sensor in accordance with an embodiment.

A cross-sectional side view of an illustrative ambient light sensor for use in one or more electronic devices in system 8 such as device 10 of FIG. 3 is shown in FIG. 4. As shown in FIG. 4, ambient light sensor 68 may be mounted in ambient light sensor assembly 36. Ambient light sensor assemblies such as ambient light sensor assembly 36 may be mounted under a portion of active area AA of display 14 or under a portion of inactive display area IA as shown in FIG. 3 and/or may be mounted elsewhere in device 10.

Ambient light sensor assembly 36 includes one or more support structures 52 that serve as a package and mounting structure for ambient light sensor components. These support structures may be formed from black polymer or other material. Adhesive and other coupling structures may be used to couple support structures together.

If desired, assembly 36 may include a light guide (e.g., a light guide formed from glass, clear polymer, and/or other transparent materials). A light guide may help transport light to be measured from an ambient light sensor window to sensor 68. In the example of FIG. 4, light guide structures have been omitted.

In addition to an optional light guide, assembly 36 may include one or more optical elements 46 (e.g., diffuser layers, infrared-light-blocking-and-visible-light-transmitting filters, etc.). Optical filters in assembly 36 may be used to block undesired wavelengths of light (e.g., infrared and/or ultraviolet light) while passing desired wavelengths of light (e.g., visible wavelengths) to ambient light sensor 68. If desired, light diffusing and/or light filtering capabilities may be incorporated into a light guide in addition to or instead of using separate component(s) 46 to perform these functions.

Ambient light sensor 68 may be mounted on a substrate such as substrate 58 (e.g., a printed circuit with signal lines coupled to signal lines in other printed circuits in device 10). Ambient light sensor 68 may be formed from a semiconductor die 56 (e.g., a silicon die) with multiple photodetectors 60. Each photodetector 60 may have a corresponding color filter 64 through which light passes before reaching that photodetector. Color filters 64 may be formed from colored polymer layers or other materials that pass particular bands of wavelengths (e.g., different colors of light) and/or may be formed from thin-film interference filters with different pass bands. As an example, color filters 64 may include a first color filter that passes red light, a second color filter that passes blue light, and additional color filters that pass light of different colors. With this type of arrangement, different photodetectors 60 detect light of different colors. There may be, for example, at least 3, at least 6, at least 10, fewer than 20, fewer than 9, or other suitable number of photodetectors 60 on die 56. A multichannel light sensor such as sensor 68 of FIG. 4 may measure the relative contribution of each color of light that is present and may therefore serve as a color ambient light sensor that measures both the total light intensity of ambient light and ambient light color. Ambient light color measurements may be gathered as color coordinates, a color temperature, a correlated color temperature, a light spectrum, or as color measurement data represented using other color measurement formats.

In some operating scenarios, ambient light sensor 68 may be used to gather measurements of ambient light (e.g., ambient light intensity measurements and ambient light color measurements). During normal operation of device 10 (e.g., normal operation of portable device 10C of FIG. 2 or other electronic device 10 in system 8), ambient light measurements may be used by control circuitry 12 in making dynamic display adjustments. For example, when bright ambient lighting conditions are detected, display brightness can be increased. Displaying content on display 14 with an enhanced intensity in bright lighting conditions may help ensure that the content can be viewed by a user. In dim lighting conditions, display brightness can be reduced to conserve power and avoid an overly bright display. Color changes in the ambient lighting environment can also be taken into account. In warm ambient lighting conditions, the content on display 14 can be warmed accordingly to avoid an undesirable mismatch between the color of the environment and the color cast of displayed content. In cool ambient lighting conditions, the color cast of images on display 14 (e.g., the white point of display 14) can be shifted to a colder setting.

In addition to using ambient light sensor 68 for dynamic display measurements, ambient light sensor 68 can be used to measure display light during display calibration operations. As an example, source 10A of FIG. 2 can provide device 10B of FIG. 2 with test output. The test output may be presented in a rectangular subregion of the display of device 10B that serves as a test target, may be displayed on all of the display of device 10B, and/or may be output using other patterns. Test output may be temporally constant (e.g., a test patch of uniform color and intensity can be displayed during test measurements) and/or test output may include time-varying content (e.g., flashing test patches of different intensities and/or different colors).

Device 10C can use ambient light sensor 68 to measure the color and intensity of test light when device 10C is held face down against the surface of the display in device 10B over the test target or is otherwise oriented to receive and measure the test light (e.g., by placing device 10 in a position in which ambient light sensor 68 measures test light from the display of device 10B without measuring ambient light from the user's environment due to sunlight, indoor lighting, and other environmental lighting sources that might interfere with the test light measurements).

Figure 5:
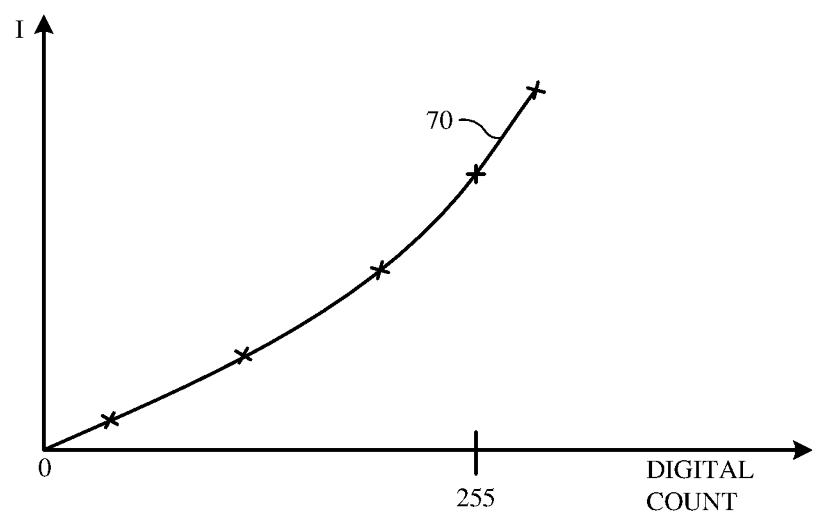
FIG. 5 is a graph of an illustrative gamma curve for a display that has been measured using an ambient light sensor in an electronic device in accordance with an embodiment.

In scenarios in which display output light for a test is provided at multiple color and multiple intensities, gamma curves such as illustrative gamma curve 70 of FIG. 5 can be gathered. Each gamma curve may be obtained by measuring display output intensity I for a given color at multiple digital pixel values (e.g., pixel values from 0 to 255 as an example). Gamma curves can be obtained for each color of pixel in the display. For example, if the display of device 10B h as red, green, and blue pixels, three sets of tests can be performed. During red pixel testing, the display can produce a test pattern of red light at multiple different digital counts while using ambient light sensor 68 to make corresponding measurements of display light intensity I (while device 10C held against the test pattern on the surface of the display). Green and blue pixel tests can also be performed in this way. By gathering gamma curve measurement such as these or other information on display light measurements while source device 10A provides device 10B with corresponding test images, the performance of the display in device 10B can be calibrated. Calibration information from these calibration measurements can be stored in source device 10A and used by source device 10A during subsequent operations, thereby ensuring that images provided by source device 10A to device 10B for displaying on the display of device 10B during normal operation will be displayed for the user satisfactorily (e.g., with suitable visual attributes such as color cast, contrast, intensity, etc.).

Figure 6:
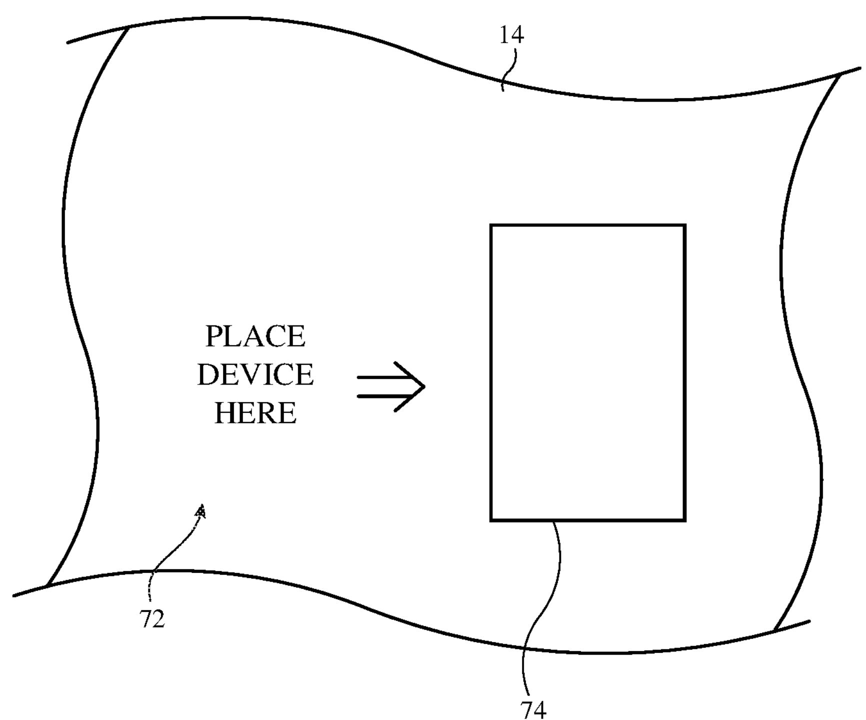
FIG. 6 is a diagram of a portion of an illustrative display that is being used to display instructions and a test target in accordance with an embodiment.

During test measurements, device 10B, device 10C, and/or other equipment in system 8 may provide visual and/or audible instructions to a user. Consider, as an example, the scenario of FIG. 6. In this example, source 10A has provided device 10B with instructions 72 that device 10B displays on display 14 of device 10B. Instructions 72 may include text, graphics, video, still images, and/or other visual content that help a user place device 10C in a suitable location on the surface of display 14 during testing. In the illustrative configuration of FIG. 6, device 10B is displaying a target such as target 74 while the rest of display 14 of device 10B is black or is displaying only instructions 72. Target 74 may serve as an alignment and test target. The shape and size of target 74 may be about the size of device 10C, thereby helping to encourage the user of device 10C to place device 10C against the surface of display 14 in an appropriate location. As an example, if device 10C is a cellular telephone, target 74 may have the shape of a cellular telephone and a size about equal to or larger than a cellular telephone). Once the cellular telephone or other device 10B is pressed against the surface of display 14 overlapping target 74 (e.g., face down with ambient light sensor 68 facing target 74), the color and intensity of target 74 can be varied. Ambient light sensor 68 of device 10B can be synchronized with the various target colors and intensities of target 74 during calibration, thereby allowing sensor 68 to gather gamma curves and other display light measurements to characterize the performance of display 14. If desired, system 8 may automatically determine the location of device 10C on the display of device 10B. For example, device 10A can output search patterns of light at various locations on the display of device 10B while device 10A uses the ambient light sensor in device 10A to determine whether the search pattern light is detected. By successively decreasing the area of the search pattern light and by moving the search pattern light about the surface of the display while monitoring feedback from device 10C, system 8 can determine the location of device 10C on device 10B and can therefore automatically locate target 74 in an appropriate location where device 10C is located.

Figure 7:
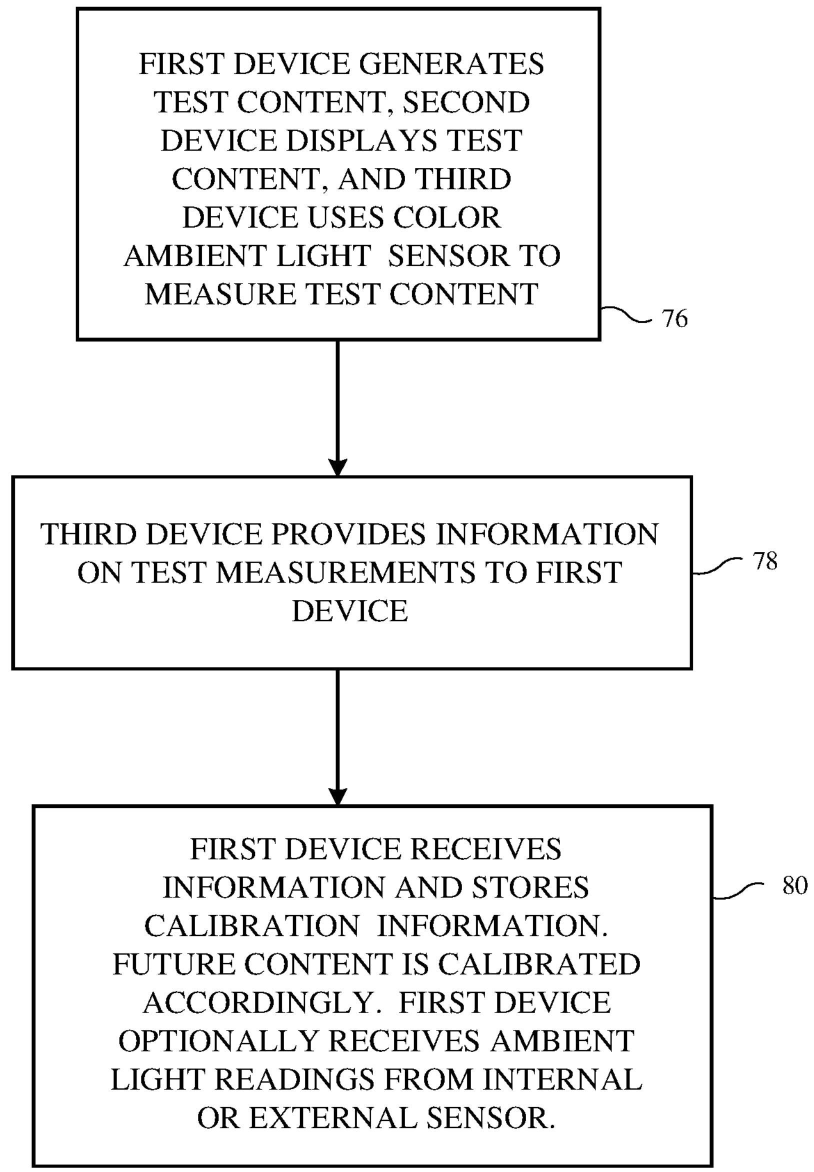
FIGS. 7 and 8 are flow charts of illustrative operations involved in calibrating and using a display in accordance with an embodiment.

FIG. 7 is a flow chart of illustrative operations involved in using system 8 to make display calibration measurements.

During the operations of block 76, a first electronic device such as source device 10A of FIG. 2 generates test images that are supplied to a second electronic device such as display device 10B (e.g., over a wired path such as a cable between devices 10A and 10B or over a wireless link). The test images may include one or more colors of light at one or more different intensities and may be presented in any suitable pattern (e.g., target 74 of FIG. 6, etc.). Display 14 of device 10B displays the test images while a third device such as portable device 10C uses ambient light sensor 68 to synchronously gather corresponding test measurements (e.g., color and intensity light measurements on the display light output by display 14 of device 10B). After device 10C gathers information on the output of display 14 during testing, device 10C may supply the test measurements to device 10A (e.g., during the operations of block 78).

During the operations of block 80, device 10A receives the test information and stores corresponding calibration information for future use. System 8 may use any suitable resources to process raw test measurements to produce calibration data. For example, device 10C and/or device 10A may use control circuitry 12 to produce calibration data based on gamma curve measurements and/or other measurements of display characteristics. The calibration data may include gamma curve settings, white point adjustments, brightness adjustments, and/or other calibration settings for device 10A. If desired, multiple passes may be made during calibration operations (e.g., rough calibrations may initially be performed followed by fine tuning measurements, etc.).

When it is desired to display visual content during normal operation, device 10A uses the stored calibration information to ensure that images provided to device 10B are calibrated as desired. Device 10A may, as an example, use a display pipeline in control circuitry 12 to map pixel values form source content into calibrated pixel values (e.g., device 10A can adjust the white point of images at the source of the images) using the calibration data. If desired, display 14 can be calibrated from the calibration data by supplying the calibration information to device 10B (e.g., from device 10C and/or device 10A). When device 10B is calibrated in this way, device 10A can provide device 10B with original (unmodified) images and device 10B can display these images with an adjusted white point (and/or other suitable display adjustments such as gamma adjustments) based on the calibration data in device 10B. In some arrangements, device 10B and device 10C can be used to perform calibration (e.g., device 10B can display test patterns while device 10C performs calibration). Configurations in which devices 10A, 10B, and 10C are involved in performing display calibration operations and in which device 10B provides information for calibrating the display in device 10B to display 10A are sometimes described herein as an example.

During the operations of bock 80, when device 10B is displaying calibrated content from device 10A, ambient light information from one or more devices in system 10 may be used in adjusting display settings. As an example, an ambient light sensor in device 10B, 10C, or additional device 10D (e.g., a voice-activated speaker in the vicinity of device 10B such as in the same room as device 10B), may use an ambient light sensor (e.g., sensor 68) to gather real-time ambient light readings. These readings may be used by device 10A and/or by device 10B in adjusting content on display 14 of device 10B. For example, content brightness may be increased by device 10A and/or the display brightness setting of the display in device 10B may be increased in bright ambient lighting conditions and may be decreased in dim lighting conditions. Ambient light color measurements may also be used by device 10A or device 10B to dynamically adjust the white point of content from device 10A while display 14 of device 10B is displaying this content.

Software on device 10A and 10B and/or other software in system 8 may be used in controlling the operation of system 8 during display calibration measurements.

Figure 8:
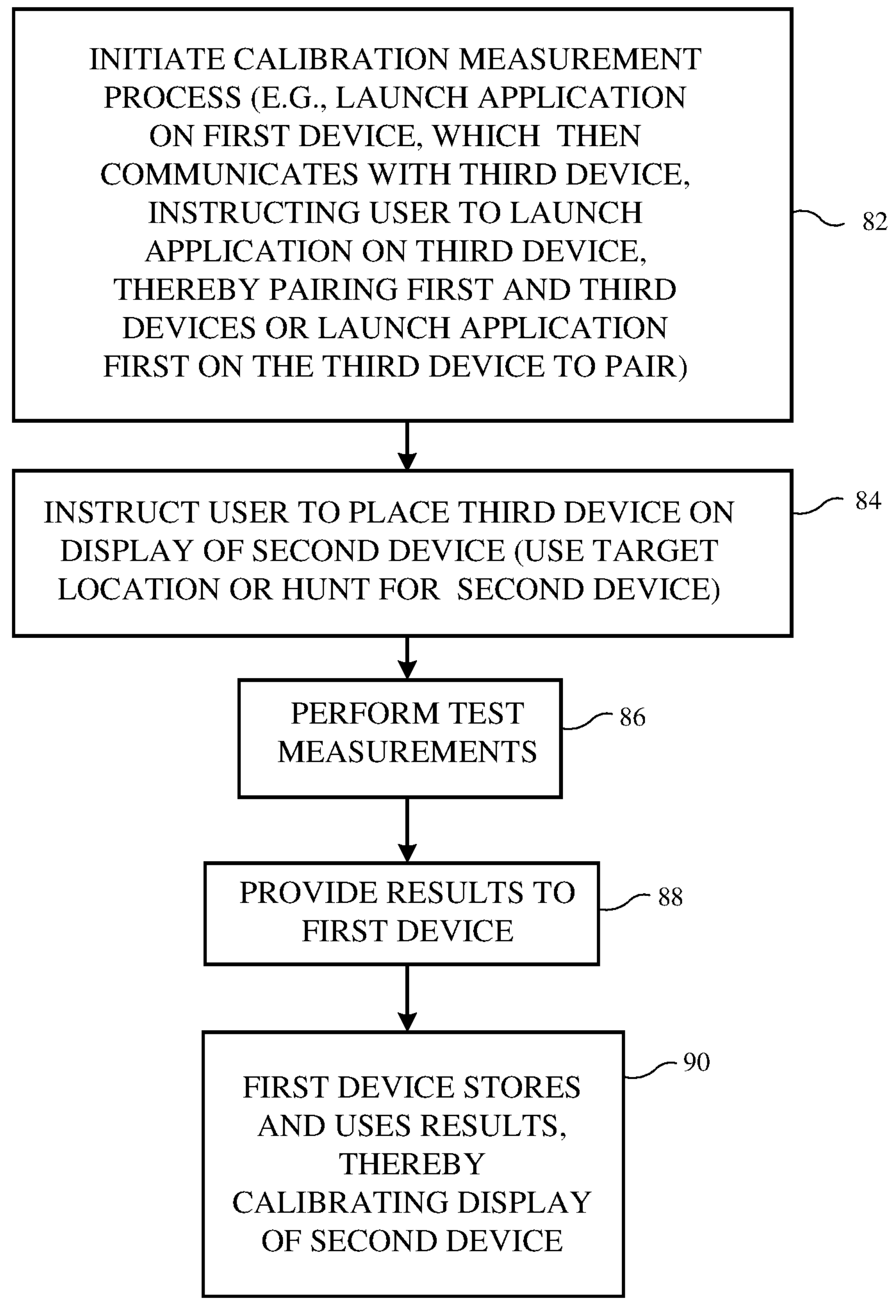

Consider, as an example, the illustrative operations of the flow chart of FIG. 8.

During the operations of block 82, calibration operations may be initiated. A user may, for example, launch an application on device 10A to initiate calibration. The launched application on device 10A configures device 10A to communicate with device 10C. Device 10A may, as an example, direct device 10C to display information instructing a user of device 10C to launch a corresponding calibration application on device 10C that pairs devices 10A and 10C and allows devices 10A and 10C to communicate and synchronize their operations during calibration. If desired, calibration may be initiated using device 10C. A user may, for example, launch an application on device 10C to establish communications with device 10A and/or a user may otherwise initiate calibration operations in system 8. The use of device 10A to initiate communications between devices 10A and 10C is illustrative. In general, calibration functions by the devices in system 8 may be performed using operating system functions, stand-alone calibration applications, portions of other software routines, and/or other code.

Once activated through user interactions or automatic operations, device 10A may, during the operations of block 84, direct device 10B to display instructions 72 that instruct the user to place device 10C against an appropriate portion of the display of device 10B, so that ambient light sensor 68 of device 10C can make display calibration measurements. Device 10C may, as an example, be placed with front side F facing display 14 of device 10B in a location where device 10C and, in particular, ambient light sensor 68 of device 10C overlaps with target 74. If desired, device 10C can be placed on the display of device 10B before target 74 is displayed and system 8 can automatically hunt for the location of device 10C (e.g., device 10A can display search patterns of light on device 10B while device 10C provides feedback until the locations of device 10C on the display of device 10B has been ascertained).

During the operations of block 86, source 10A provides test images of one or more colors and one or more intensities, thereby directing device 10B to use target 74 on display 14 to display light of these colors and intensities to the ambient light sensor of device 10C. Device 10C operates in synchronization with device 10A and makes measurements of the test content being displayed on device 10B using ambient light sensor 68 in device 10C. During the operations of block 86, devices 10A and 10C are in communication with each other (e.g., these devices are paired) and therefore can synchronize operation and share data (e.g., over a wireless communications link in system 8).

During the operations of block 88, information on the ambient light sensor measurements of the display test light provided by target 74 of device 10B may be conveyed from device 10C to device 10A (e.g. over a wireless link). Test results can be provided as raw measurements that are converted into calibration settings by device 10A and/or may be provided as calibration settings.

During the operations of block 90, the display calibration information associated with the testing of block 86 and the information transfer process of block 88 can be used by device 10A in calibrating images provided by device 10A to the display of device 10B. For example, the calibration information stored in device 10A can be used in adjusting the white point of images supplied by device 10A to device 10B, can be used to make contrast and/or intensity adjustments, and/or can otherwise be used in adjusting content to calibrate display 14. If desired, device 10A may also use information from additional equipment (e.g., device 10D of FIG. 2) in adjusting image content supplied to device 10B. For example, device 10A may make brightness and/or color cast (white point) adjustments based on real-time ambient light sensor measurements made with device 10D and/or device 10B may make these brightness and/or color cast adjustments based on real-time ambient light sensor measurements made with device 10D.

In general, any set of electronic devices 10 in system 8 may supply display 14 with test images, any ambient light sensor or other light sensor (e.g., a camera, etc.) that is oriented to measure corresponding test image light during testing can be used to measure the test images, and any device or devices in system 8 may be provided with calibration data to use during subsequent image output operations. The arrangement described in connection with FIG. 8 is illustrative.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. A source electronic device operable in a system with a display device that has a display and a portable device with an ambient light sensor, comprising:

control circuitry configured to supply test images to the display device that the display device displays on the display while the ambient light sensor of the portable device measures corresponding test light from the displayed test images through a display cover layer of the portable device that overlaps display pixels in the portable device; and wireless communications circuitry configured to receive information on the test light measurements from the portable device, wherein the control circuitry is configured to calibrate an image that is provided to the display device using the information.

2. The source electronic device defined in claim 1 wherein the source electronic device is configured to supply the test images with time-varying color and time-varying intensity in a target region on the display.

3. The source electronic device defined in claim 2 wherein the control circuitry is further configured to supply instructions to the display device that the display device displays for a user on the display to instruct the user to place the portable device against the target region.

4. The source electronic device defined in claim 3 wherein the display device comprises a television, wherein the portable device comprises a cellular telephone, and wherein the control circuitry is configured to supply the test images to the television while the cellular telephone is adjacent to a surface of the display in the television.

5. A method of operating a source electronic device in a system that includes a display electronic device and a portable electronic device, comprising:

with the source electronic device, supplying visual content to the display electronic device that the display electronic device displays, wherein the source electronic device has a first housing that is separate from a second housing of the display electronic device;

with the source electronic device, providing test images to the display electronic device that the display electronic device displays while an ambient light sensor in the portable electronic device gathers measurements of the test images through a display cover layer of the portable electronic device that overlaps display pixels in the portable electronic device;

receiving information on the measurements of the test images from the portable electronic device with wireless communications circuitry in the source electronic device; and with control circuitry in the source electronic device, providing the display electronic device with content calibrated using the received information.

6. The method defined in claim 5 wherein providing the test images comprises providing test images of different colors.

7. The method defined in claim 6 wherein providing the test images comprises providing test images of different intensities.

8. The method defined in claim 7 wherein providing the display electronic device with the calibrated content comprises adjusting a white point of the content based on the received information.

9. The method defined in claim 7 wherein providing the display electronic device with the calibrated content comprises adjusting an output intensity for the content based on the received information.

10. The method defined in claim 7 wherein providing the display electronic device with the calibrated content comprises adjusting contrast for the content based on the received information.

11. The method defined in claim 5 further comprising:

with the source electronic device, providing instructions to the display electronic device that the display electronic device displays to inform a user that the portable electronic device should be placed over a target on a surface of a display in the display electronic device.

12. The method defined in claim 5 further comprising:

with the source electronic device, receiving ambient light measurements from a voice-controlled electronic device that has a speaker; and using the received ambient light measurements in providing the display electronic device with the calibrated content.

13. The method defined in claim 12 wherein providing the test images comprises providing test images of different colors and different intensities while the portable electronic device uses the ambient light sensor to gather gamma curve measurements.

14. The method defined in claim 13 wherein the display electronic device comprises a television and wherein providing the test images to the display electronic device comprises providing the test images to the television.

15. A method of using a portable electronic device in a system having a source electronic device that provides visual content to a display electronic device, comprising:

with an ambient light sensor in the portable electronic device, measuring ambient light;

adjusting a display of the portable electronic device based on the measured ambient light;

with the ambient light sensor, measuring light from the display electronic device in response to test content provided to the display electronic device from the source electronic device; and with the portable electronic device, providing information on the measured light to the source electronic device to calibrate the display electronic device.

16. The method defined in claim 15 wherein the display electronic device comprises a television with a display that is configured to output the light in response to the test content and wherein measuring the light from the display electronic device comprises measuring the light from the display of the television.

17. The method defined in claim 16 wherein the ambient light sensor comprises a color ambient light sensor, wherein the portable electronic device comprises a cellular telephone, and wherein measuring the light from the display electronic device comprises using the ambient light sensor in the cellular telephone to measure the light from the display of the television.

18. The method defined in claim 17 wherein the source electronic device is coupled to the television by a communications path formed from a selected one of: a cable and a wireless link and wherein measuring the light from the display electronic device comprises measuring light from a test target displayed on the television based on the test content from the source electronic device.

19. The method defined in claim 18 wherein the test content comprises test content of different colors and different intensities and wherein measuring the light from the display electronic device comprises measuring light from the test target of different colors and different intensities with the color ambient light sensor.

20. The method defined in claim 16 wherein the test content comprises test content with time-varying colors and time-varying intensities and wherein measuring the light from the display electronic device comprises measuring the colors and intensities of the test content with the ambient light sensor to obtain gamma curves.

* * * * *